United States Patent
Imanishi

(10) Patent No.: US 6,716,135 B2
(45) Date of Patent: Apr. 6, 2004

(54) TOROIDAL-TYPE CONTINUOUSLY VARIABLE TRANSMISSION

(75) Inventor: Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 51 days.

(21) Appl. No.: 09/950,708

(22) Filed: Sep. 13, 2001

(65) Prior Publication Data

US 2002/0037787 A1 Mar. 28, 2002

(30) Foreign Application Priority Data

Sep. 14, 2000 (JP) .................................... P. 2000-280189

(51) Int. Cl.[7] ................................................ F16H 15/38
(52) U.S. Cl. ................................ 476/40; 476/2; 476/10
(58) Field of Search ................................ 476/10, 2, 40, 476/46, 42

(56) References Cited

U.S. PATENT DOCUMENTS

| | | | | |
|---|---|---|---|---|
| 3,440,895 A | * | 4/1969 | Fellows | 476/10 |
| 4,297,918 A | * | 11/1981 | Perry | 476/10 |
| 4,554,841 A | * | 11/1985 | Okoshi | 476/10 |
| 4,955,246 A | | 9/1990 | Nakano | |
| 5,048,359 A | | 9/1991 | Nakano | |
| 5,099,710 A | * | 3/1992 | Nakano | 476/10 |
| 5,395,292 A | * | 3/1995 | Fellows et al. | 476/10 |
| 5,676,618 A | | 10/1997 | Nakano et al. | |
| 5,679,090 A | | 10/1997 | Imanishi | |
| 5,720,689 A | * | 2/1998 | Imanishi et al. | 476/40 |
| 5,902,207 A | * | 5/1999 | Sugihara | 476/10 |
| 5,980,421 A | * | 11/1999 | Machida et al. | 476/10 |
| 6,132,331 A | * | 10/2000 | Imanishi et al. | 476/10 |
| 6,132,333 A | * | 10/2000 | Inoue et al. | 477/37 |
| 6,152,850 A | * | 11/2000 | Inoue et al. | 476/46 |
| 6,174,258 B1 | * | 1/2001 | Imanishi et al. | 476/40 |
| 6,226,583 B1 | * | 5/2001 | Iwata | 701/51 |
| 6,375,595 B1 | * | 4/2002 | Machida et al. | 476/42 |
| 6,440,034 B1 | * | 8/2002 | Ishikawa et al. | 476/46 |
| 6,488,607 B1 | * | 12/2002 | Tanaka et al. | 476/2 |

FOREIGN PATENT DOCUMENTS

| | | |
|---|---|---|
| JP | 62-71465 | 5/1987 |
| JP | 7-243496 | 9/1995 |
| JP | 7-259947 | 10/1995 |
| JP | 7-280055 | 10/1995 |
| JP | 8-14350 | 1/1996 |
| JP | 8-14351 | 1/1996 |
| JP | 8-14353 | 1/1996 |
| JP | 8-135746 | 5/1996 |
| JP | 8-145134 | 6/1996 |
| JP | 8-145136 | 6/1996 |
| JP | 8-178008 | 7/1996 |
| JP | 9-287646 | 11/1997 |
| JP | 11-303963 | 11/1999 |

* cited by examiner

Primary Examiner—David A. Bucci
Assistant Examiner—Julie K. Smith
(74) Attorney, Agent, or Firm—Sughrue Mion, PLLC

(57) ABSTRACT

A toroidal-type continuously variable transmission includes three trunnions and power rollers in a single cavity. One of the trunnions is shifted by a pair of oil pressure actuators, each of a single-acting type. The remaining two trunnions are respectively shifted by separate oil pressure actuators, each of a double-acting type.

5 Claims, 10 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used, for example, as a transmission unit for a transmission of a vehicle or as a transmission for various industrial machines.

2. Description of the Related Art

Conventionally, use of such a toroidal-type continuously variable transmission as shown in FIGS. 5 and 6 as a transmission of a vehicle has been studied and used in some sectors of the vehicle industry. In this toroidal-type continuously variable transmission, for example, as disclosed in JP-62-714650, an input side disk 2 is supported concentrically with an input shaft 1 and an output side disk 4 is fixed to the end portion of an output shaft 3 which is disposed concentrically with the input shaft 1. In the interior of a casing 5 (see FIG. 8 which will be discussed later) in which a toroidal-type continuously variable transmission is stored, there are disposed trunnions 7, 7 respectively swingable about their associated pivot shafts 6, 6 which are disposed at positions respectively twisted with respect to the input shaft 1 and output shaft 3.

On each of the trunnions 7, 7, there are disposed a pair of units (two units) of the above-mentioned pivot shafts 6; more specifically, the pair of pivot shafts 6 are disposed on the outer surfaces of the two end portions of each trunnion 7 in such a manner that the two pivot shafts 6, 6 are concentric with each other. The center axes of these pivot shafts 6, 6 are present at twisted positions which do not cross with the center axes of the disks 2, 4 but extend in a direction at right angles or substantially right angles with respect to the direction of the center axes of the disks 2, 4. Also, the base half sections of displacement shafts 8, 8 are supported on the central portions of the trunnions 7, 7 and thus, by swinging the trunnions 7, 7 about the pivot shafts 6, 6, the inclination angles of the displacement shafts 8, 8 can be adjusted freely. On the peripheries of the front half sections of the displacement shafts 8, 8 which are respectively supported on their associated trunnions 7, 7, there are rotatably supported power rollers 9, 9, respectively. And, the power rollers 9, 9 are held by and between the respective inner surfaces 2a, 4a of the input side and output side disks 2, 4.

The section of each of the mutually opposing inner surfaces 2a, 4a of the input side and output side disks 2, 4 has an arc-shaped concave surface which can be obtained by rotating an arc with the pivot shaft 6 as the center thereof or by rotating a curved line which is approximate to such arc. And, the peripheral surfaces 9a, 9a (each of which is formed as a spherically convex surface) of the power rollers 9, 9 are respectively contacted with the inner surfaces 2a, 4a of the input side and output side disks 2, 4. Also, between the input shaft 1 and input side disk 2, there is interposed a loading cam device 10, and the loading cam device 10 presses the input side disk 2 elastically toward the output side disk 4, to thereby drive or rotate the input side disk 2 freely.

When the above-structured toroidal-type continuously variable transmission is in use, as the input shaft 1 is rotated, the loading cam device 10 rotates the input side disk 2 while pressing it against the plurality of power rollers 9, 9. And, the rotation of the input side disk 2 is transmitted through the plurality of power rollers 9, 9 to the output side disk 4, thereby rotating the output shaft 3 which is fixed to the output side disk 4.

Now, description will be given below of a case where the rotation speeds of the input shaft 1 and output shaft 3 are changed. First, in case where deceleration is made between the input shaft 1 and output shaft 3, the trunnions 7, 7 are respectively swung about their associated pivot shafts 6, 6 to thereby incline the displacement shafts 6, 8 in such a manner that the peripheral surfaces 9a, 9a of the power rollers 9, 9, as shown in FIG. 5, are respectively contacted with the near-center portion of the inner surface 2a of the input side disk 2 and with the near-outer-periphery portion of the inner surface 4a of the output side disk 4.

On the other hand, in the case of acceleration, the trunnions 7, 7 are respectively swung about their associated pivot shafts 6, 6 to thereby incline the displacement shafts 8, 8 in such a manner that the peripheral surfaces 9a, 9a of the power rollers 9, 9, as shown in FIG. 6, are respectively contacted with the near-outer-periphery portion of the inner surface 2a of the input side disk 2 and with the near-center portion of the inner surface 4a of the output side disk 4. By the way, in case where the inclination angles of the displacement shafts 8, 8 are set in the intermediate between those shown in FIGS. 5 and 6, there can be obtained an intermediate gear change ratio between the input shaft 1 and output shaft 3.

Further, FIGS. 7 and 8 respectively show a further specific version of a toroidal-type continuously variable transmission which is disclosed in U.S. Pat. No. 4,955,246. Specifically, in this toroidal-type continuously variable transmission, an input side disk 2 and an output side disk 4 are rotatably supported on the periphery of a cylindrical-shaped input shaft 11, respectively. Also, between the input side disk 2 and the end portion of the input shaft 11, there is interposed a loading cam device 10. On the other hand, to the output side disk 4, there is connected an output gear 12 in such a manner that the output side disk 4 and output gear 12 can be rotated in synchronization with each other.

In the toroidal-type continuously variable transmission, there are disposed a pair of trunnions 7, 7. On the two end portions of each trunnion 7, there are disposed pivot shafts 6, 6 which are concentric with each other. The pivot shafts 6, 6 are respectively supported on a pair of support plates 13, 13 serving as support members in such a manner that they can be swung and can be shifted in the axial direction thereof (in FIG. 7, in the front and back direction; and, in FIG. 8, in the right and left direction). And, the base half sections of displacement shafts 8, 8 are supported on the intermediate portions of the trunnions 7, 7. These displacement shafts 8, 8 are structured such that the base half sections and front half sections thereof are eccentric with respect to each other. Also, the base half sections of the displacement shafts 8, 8 are rotatably supported on the intermediate portions of the trunnions 7, 7, while power rollers 9, 9 are rotatably supported on the front half sections of the displacement shafts 8, 8, respectively.

By the way, the pair of displacement shafts 8, 8 are disposed at positions just 180° opposite to each other with the input shaft 11 between them. Also, the direction in which the base half sections and front half sections of the displacement shafts 8, 8 are eccentric with each other is set as the same direction (in FIG. 8, the reversed right-and-left direction) with respect to the rotation direction of the input side and output side disks 2, 4. Further, this eccentric direction is a direction which extends substantially at right angles to a direction where the input shaft 11 is disposed.

Therefore, the power rollers 9, 9 are supported in such a manner that they can be shifted slightly with respect to the direction where the input shaft 11 is disposed.

Also, between the outer surfaces of the power rollers 9, 9 and the inner surfaces of the intermediate portions of the trunnions 7, 7, there are interposed thrust ball bearings 14, 14 and thrust needle roller bearings 15, 15 sequentially in order starting from the outer surfaces of the power rollers 9, 9. The thrust ball bearings 14, 14, while supporting thrust-direction loads applied to the power rollers 9, 9, allow the power rollers 9, 9 to rotate, Also, the thrust needle roller bearings 15, 15, while supporting thrust loads applied from the power rollers 9, 9 to outer races 16, 16 forming the thrust ball bearings 14, 14, allow the front half sections of the displacement shafts 8, 8 and the outer races 16, 16 to swing about the base half sections of the displacement shafts 8, 8. Further, the trunnions 7, 7 are structured such that they can be shifted in the axial directions of the pivot shafts 6, 6 by their associated actuators 17, 17 of an oil-pressure type.

In the case of the above-structured toroidal-type continuously variable transmission, the rotation of the input shaft 11 is transmitted through the loading cam device 10 to the input side disk 2. And, the rotation of the input side disk 2 is transmitted through the pair of power rollers 9, 9 to the output side disk 4 and, further, the rotation of the output side disk 4 is taken out from the output gear 12.

To change the rotation speed ratio between the input shaft 11 and output gear 12, using the actuators 17, 17, the pair of trunnions 7, 7 may be shifted respectively in their mutually opposite directions; for example, the power roller 9 disposed in the lower stage in FIG. 8 may be shifted right in FIG. 8, whereas the power roller 9 disposed in the upper stage in FIG. 8 may be shifted left in FIG. 8. This changes the direction of tangential-direction forces to be applied to the contact portions between the peripheral surfaces 9a, 9a of the power rollers 9, 9 and the inner surfaces 2a, 4a of the input side and output side disks 2, 4. With such change of the direction of the forces, the trunnions 7, 7 are swung in the mutually opposite directions about their respective pivot shafts 6, 6 which are pivotally supported on the support plates 13, 13. As a result of this, as shown in FIGS. 5 and 6, the contact positions between the peripheral surfaces 9a, 9a of the power rollers 9, 9 and the inner surfaces 2a, 4a of the input side and output side disks 2, 4 are shifted, thereby changing the rotation speed ratio between the input shaft 11 and output gear 12.

When power is transmitted by the toroidal-type continuously variable transmission, the power rollers 9, 9 are shifted in the axial direction of the input shaft 11 due to the elastic deformation of the component parts of the toroidal-type continuously variable transmission. And, the displacement shafts 8, 8, which support the power rollers 9, 9, are slightly rotated with their respective base half sections as the rotation centers thereof. As a result of this slight rotation, the outer surfaces of the outer races 16, 16 of the thrust ball bearings 14, 14 and the inner surfaces of the trunnions 7, 7 are shifted with respect to each other. Between these outer and inner surfaces, there are present the thrust needle roller bearings 15, 15 and, therefore, the relative shift of the outer and inner surfaces requires a small force.

In the case of the toroidal-type continuously variable transmission providing the above-mentioned structure and operation, power transmission between the input shaft 11 and output gear 12 is carried out by the two power rollers 9, 9. Therefore, a force per unit area, which is transmitted between the peripheral surfaces 9a, 9a of the power rollers 9, 9 and the inner surfaces 2a, 4a of the input aide and output side disks 2, 4, is large; and, the limit of the power that can be transmitted is relatively low. In view of such circumstances, conventionally, there has been proposed an idea that, in order to be able to increase the power that can be transmitted by a toroidal-type continuously variable transmission, the number of power rollers 9, 9 is increased.

Conventionally, as a structure for increasing the number of power rollers 9, 9 for this purpose, there is known a structure in which, for example, as disclosed in U.S. Pat. No. 5,048,359, between a set of input side and output side disks 2 and 4, there are interposed three power rollers 9, 9 and transmission of power is carried out by these three rollers 9, 9. In the case of the structure disclosed in the cited patent, as shown in FIG. 9, at three positions of a fixed frame 18 which are spaced at equal distances from each other in the circumferential direction of the fixed frame 18, there are pivotally supported the respective intermediate portions of three 120°—curved support pieces 19, 19 which respectively serve as support members. And, between the mutually adjoining support pieces 19, 19, there are supported their respective trunnions 7, 7 in such a manner that they can be swung as well as can be shifted in the axial direction thereof.

The respective trunnions 7, 7 can be freely shifted by their associated actuators 17, 17, of the oil-pressure type in the axial direction of pivot shafts 6 which are disposed on the two end portions of each of the trunnions 7, 7 in such a manner that they are concentric with each other. Oil pressure cylinders 20, 20, which respectively form their associated actuators 17, 17, are in communication through a control valve 21 with the discharge port of a pump 22 serving as an oil pressure source. The control valve 21 includes a sleeve 23 and a spool 24 which can be respectively shifted in the axial direction thereof (in FIG. 9, in the right and left direction). By the way, as the actuators 17, 17, there are used actuators each of a double-acting type which can generate a force in both ways of the axial direction thereof by switching the pressure oil supply and drain directions over each other.

To change the inclination angles of the power rollers 9, 9 pivotally supported on their respective trunnions 7, 7 by their respective displacement shafts 8, 8, the sleeve 23 may be shifted in the axial direction thereof (in FIG. 9, in the right and left direction), using a control motor 25. As a result of this, the pressure oil discharged from the pump 22 is fed into the respective oil pressure cylinders 20, 20 through an oil pressure pipe. And, drive pistons 26, 26, which are respectively fitted with their associated oil pressure cylinders 20, 20 and are used to shift the trunnions 7, 7 in the axial direction of their associated pivot shafts 6, 6, are caused to shift in the same direction with respect to the rotation direction of the input side and output side disks 2 and 4 (see FIGS. 5 and 6). And, similarly to the structure shown in FIGS. 7 and 8, with such shift of the drive pistons 26, 26, the trunnions 7, 7 are shifted in the axial direction of their respective pivot shafts and are swung about the pivot shafts. Also, operation oil, which is pushed out from the oil pressure cylinders 20, 20 with the shifting movements of the respective drive pistons 26, 26, is also returned to an oil basin 27 through the oil pressure pipe (a portion of which is not shown) including the control valve 21.

On the other hand, the shifting movements of the drive pistons 26 caused by the above feed of the pressure oil into the oil pressure cylinders 20 as well as the shifting movements of the trunnions 7 connected to the drive pistons 26 are transmitted to the spool 24 through precess cams 28 and links 29, thereby causing the spool 24 to shift in the axial direction thereof. As a result of this, in a state where the drive pistons 26 are shifted by a given amount, the flow passage of the control valve 21 is closed to thereby stop the supply of the pressure oil to the respective oil pressure cylinders 20, 20. Therefore, the shifting amounts of the respective trunnions 7, 7 in the axial direction thereof correspond to the shifting amount of the sleeve 23 caused by the control motor 25, In the case of the conventional toroidal-type continuously variable transmission having the above-mentioned structure and providing the above-mentioned operation, the installation space of the actuators 17, 17 is large, which increases the size of the toroidal-type continuously variable transmission. On the other hand, in JP-A-7-2599470 there is disclosed a structure in which, as shown in FIG. 10, three trunnions 7, 7 are connected in series to one another by two link mechanisms 30, 30 and these three trunnions 7, 7 can be shifted using a single actuator 17 which is a double-acting oil pressure actuator. Also, in JP-A-11-303963, there is disclosed a structure in which, as shown in FIG. 11, support pieces 19a, 19a are supported swingably and shiftably and, using these support pieces 19a, 19a, the movements of trunnions 7, 7 mutually adjoining in the circumferential direction of the structure can be transmitted to each other. In the case of the structure shown in FIG. 11 as well, driving actuators 17, 17 are freely able to press against the end faces of pivot shafts 6, 6 respectively disposed on the circumferential-direction two end portions of their associated trunnions 7, 7 in the axial directions of the pivot shafts 6, 6.

In the case of the conventional structures respectively shown in FIGS. 10 and 11, the installation space of the actuators 17 can be reduced to thereby be able to reduce the size and weight of the structures; however, to be able to restrict the shifting amounts of all of the trunnions 7, 7 severely, the movable parts of the structures must be formed very precisely, which results in the high manufacturing cost. In other words, in the toroidal-type continuously variable transmission, depending on the size thereof, there is a possibility that, in case where the trunnions 7, 7 are respectively shifted only by an amount of the order of 0.1 mm in the axial directions of their associated pivot shafts 6, 6, the toroidal-type continuously variable transmission can start its gear change operation. Therefore, in case where the shifting amounts of the respective trunnions 7, 7 are different on the order of 0.1 mm from each other, there arises a possibility that the inclination angles of the trunnions 7, 7 about their respective pivot shafts 6, 6 can differ from each other to thereby lower greatly the power transmission efficiency and durability of the toroidal-type continuously variable transmission.

That is, when enforcing the structures respectively shown in FIGS. 10 and 11, the rickety movements of the respective movable parts thereof must be minimized as much as possible to thereby synchronize the shifting movements of the three trunnions 7, 7 with each other at a difference level sufficiently lower than the level of the shifting amount of 0.1 mm (that is, with a sufficiently higher precision). Here, in order that the shifting movements of the respective movable parts can be carried out smoothly as well as the rickety movements thereof can be minimized as much as possible, the dimensional precision and shape precision of the respective components of the toroidal-type continuously variable transmission must be enhanced greatly, which makes it troublesome to work the respective components, resulting in the increased manufacturing costs of the respective components and thus the increased cost of the toroidal-type continuously variable transmission. Further, as shown in FIGS. 10 and 11, in case where the three trunnions 7, 7 are connected together in series in the shifting direction thereof and the actuators 17, 17 are disposed only on the connecting-direction end portions of trunnions 7, 7, the elastic deformation of parts including the trunnions 7, 7, which are used to transmit the shifting movements of the trunnions 7, 7, must also be taken into consideration. It is very difficult to synchronize the shifting movements of the trunnions 7, 7 with each other at a severe level (that is, at a shifting amount level sufficiently smaller than the shifting amount of 0.1 mm).

SUMMARY OF THE INVENTION

The present invention aims at eliminating the drawbacks found in the above-mentioned conventional toroidal-type continuously variable transmissions. Accordingly, it is an object of the invention to provide a toroidal-type continuously variable transmission which can be reduced in the size and weight thereof.

In attaining the above object, according to a first aspect of the invention, there is provided a toroidal-type continuously variable transmission, including: a casing; an input shaft rotatably supported within the casing; an input side disk supported on the periphery of the input shaft in such a manner as to be rotatable together with the input shaft; an output side disk disposed so as to be concentric with the input side disk and to be relatively rotatable with respect to the input side disk; trunnions interposed between the input side and output side disks in such a manner as to be respectively swung about pivot shafts disposed at twisted positions with respect to center axes of the two disks, the trunnions including three first, second and third trunnions for each pair of input side and output side disks; displacement shafts provided on the respective trunnions so as to project from the inner surfaces of the trunnions, the one displacement shaft being provided for each trunnion: power rollers rotatably supported on the respective displacement shafts and interposed between the input side and output side disks, the one power roller being provided for each trunnion; and, actuators for shifting the respective trunnions in the axial direction of the pivot shafts disposed on the two end portions of the trunnions. The actuators are composed of a pair of first oil pressure actuators of a single acting type for shifting the first trunnion in the mutually opposite directions through link arms, and second and third oil pressure actuators of a double acting type respectively disposed on the second and third trunnions.

Further, according to a second aspect of the invention, in the toroidal-type continuously variable transmission as set forth in the first aspect, supply and drain of pressure oil to and from the first to third oil pressure actuators are carried out in synchronization with one another using a single control valve.

Moreover, according to a third aspect of the invention, in the toroidal-type continuously variable transmission as set forth in the first aspect, the first oil pressure actuator includes a rod butting against one side surface of a base end portion of the link arm at a leading end face of the rod, and a portion of the base end portion of the link arm, which is to be butted against the leading end face of the rod, is formed as a partially cylindrical-shaped convexly curved surface.

In addition, according to a fourth aspect of the invention, in the toroidal-type continuously variable transmission as set forth in the first aspect, one-side surfaces of leading end portions of the link arms are respectively engaged with end portions of the pivot shafts respectively disposed on two end portions of the first trunnions, thrust needle roller bearings are respectively interposed between the one-side surfaces of the leading end portions of the link arms and the end portions of the pivot shafts, and each of the thrust needle roller bearings includes a pair of races, and one of the races, which is disposed on the link arm side, has a surface to be contacted with a leading end portion side surface of the link arm formed as a spherically convex surface or as a conically convex surface.

Further, according to a fifth aspect of the invention, in the toroidal-type continuously variable transmission as set forth in the first aspect, one-side surfaces of leading end portions of the link arms are respectively engaged with end portions of the pivot shafts respectively disposed on two end portions of the first trunnions, and the leading end portion of the link arm has a cylindrically projecting portion being loosely inserted into a circular hole formed in a central portion of the pivot shaft.

In the above-structured toroidal-type continuously variable transmission according to the invention, not only the installation space for the actuators used to shift the respective trunnions is reduced to thereby be able to reduce the size and weight of the toroidal-type continuously variable transmission but also the shift amounts of the respective trunnions are restricted severely to thereby be able to realize an accurate shifting operation. Also, even in case where the shape precision and dimension precision of the component parts of the toroidal-type continuously variable transmission are not enhanced extremely, the shift amounts of the respective trunnions can be restricted severely. Further, since an actuator is provided for each of the trunnions, there is eliminated a possibility that there can occur an error due to the elastic deformation of the shift transmitting parts including the trunnions caused by their shift transmission movements, which can also contribute toward restricting the shift amounts of the trunnions severely. Thanks to the above, the transmission efficiency and durability of the toroidal-type continuously variable transmission, in which three power rollers are interposed between a pair of input side and output side disks, can be sufficiently secured while being able to reduce the size and weight of the toroidal-type continuously variable transmission.

DETAILED DESCRIPTION OF THE PREFERRED EMBODIMENTS

Figure 1:
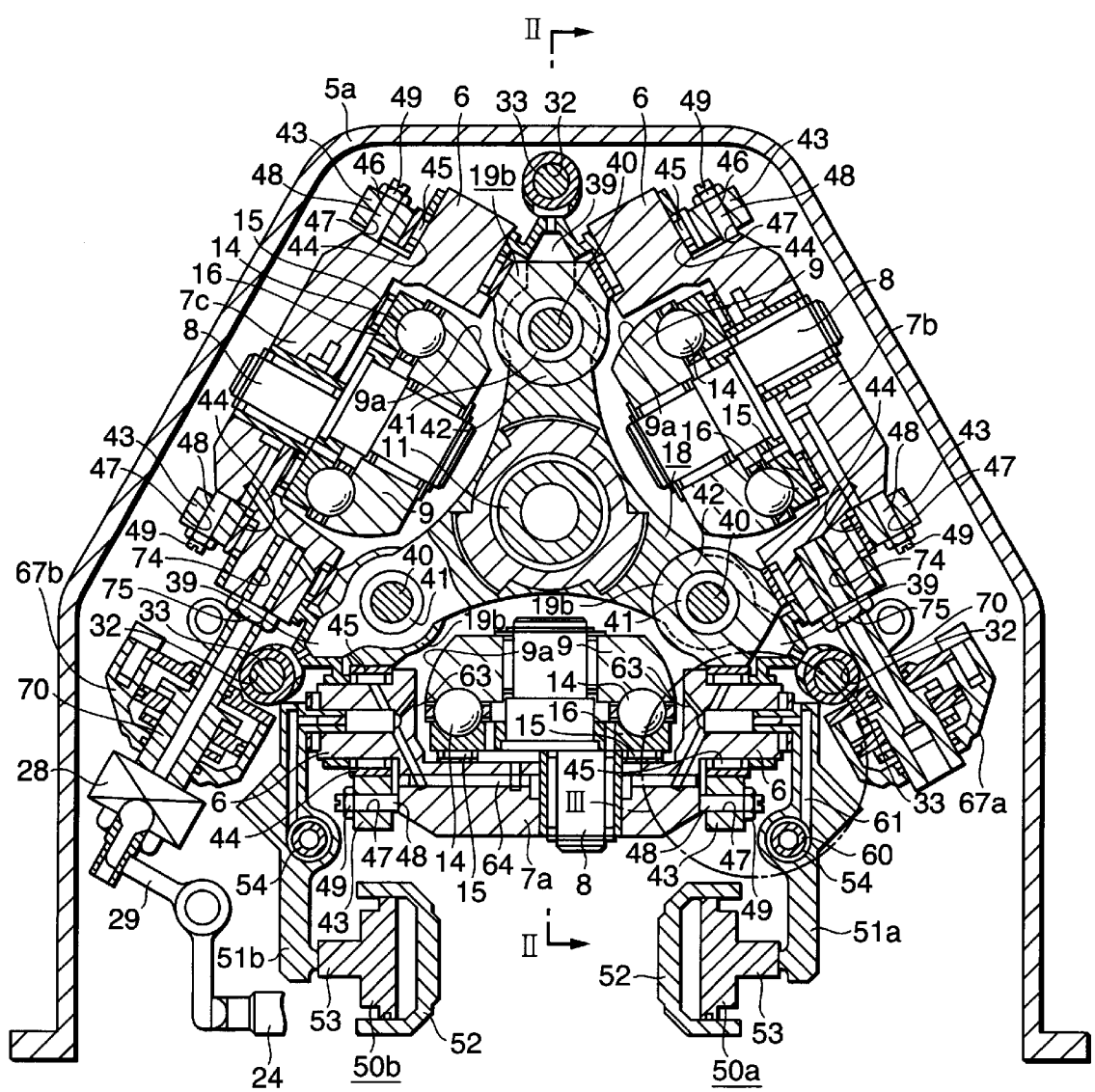
FIG. 1 is a section view of an embodiment of a toroidal-type continuously variable transmission according to the invention.
Figure 2:
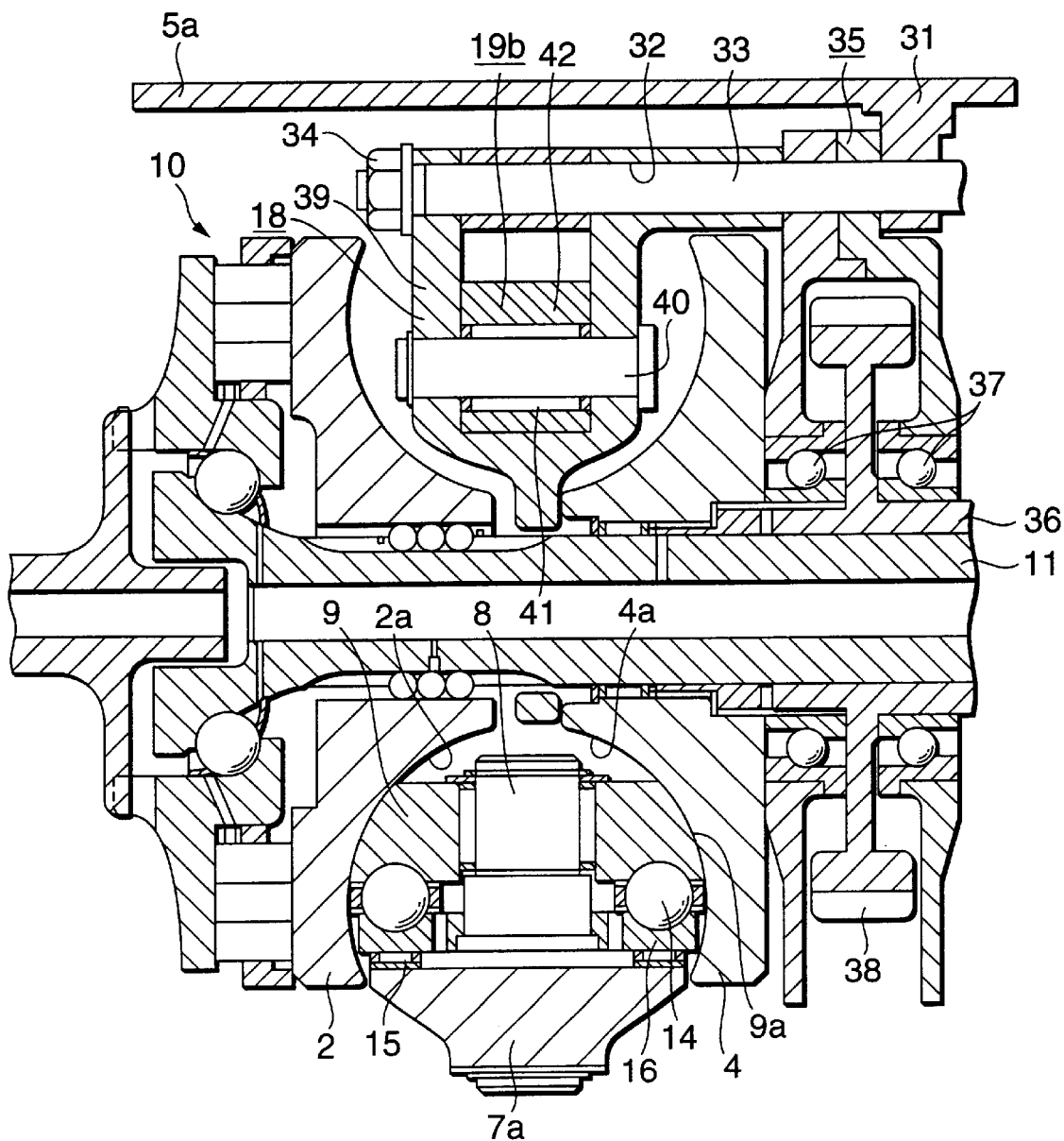
FIG. 2 is a section view taken along the line II—II shown in FIG. 1.

Now, FIGS. 1 to 4 show an example of a toroidal-type continuously variable transmission according to the invention. By the way, the present embodiment shows a case where the present invention is applied to a toroidal-type continuously variable transmission of a so called double-cavity type that input side and output side disks 2 and 4 are arranged by twos in parallel to each other with respect to the power transmission direction; and, more specifically, in the toroidal-type continuously variable transmission of a so called double-cavity type, three power rollers 9, 9 are interposed between the mutually parallel arranged input side disk 2 and output side disk 4, and thus a total of six power rollers 9, 9 are disposed. Although FIG. 2 shows only one cavity (a portion where there are disposed the input side disk 2, output side disk 4 and power rollers 9, 9 for transmission of power), on the right side of the cavity shown in FIG. 2, there exists the other cavity. The basic structure and operation of such toroidal-type continuously variable transmission of a so called double-cavity type are conventionally known and, therefore, the illustration and description of the whole structure thereof are omitted here.

A frame 18 is connected and fixed to a mounting portion 31 formed in the inner surface of a casing 5a by three studs 33, 33 respectively inserted into their associated mounting holes 32, 32 formed at three positions in the outside diameter side end portion of the frame 18 as well as by three nuts 34 respectively threadedly engaged with these studs 33, 33. In the illustrated embodiment, a gear housing 35 is fixed between the mounting portion 31 and frame 18 by the studs 33, 33 and nuts 34. An output sleeve 36, with a pair of output side disks 4 spline engaged with the two end portions thereof, is rotatably supported on the inside diameter side of the gear housing 35 by a pair of rolling bearings 37, 37; and, an output gear 38, which is disposed on the outer peripheral surface of the middle portion of the output sleeve 36, is stored in the interior of the gear housing 35.

Also, the frame 18 is formed in a star shape as a whole; and, the frame 18 is forked from the diameter-direction middle portion thereof to the outside diameter side portion thereof to thereby form three hold portions 39, 39 at equal intervals in the circumferential direction of the frame 18. And, the middle portions of support pieces 19b, 19b are respectively pivotally supported on the diameter-direction middle portions of these hold portions 39, 39 by second pivot shafts 40, 40 through needle roller bearings 41, 41. Each of the three support pieces 19b, 19b is composed of a cylindrical-shaped mounting portion 42 disposed in the periphery of the second pivot shaft 40 and a pair of support plate portions 43, 43 respectively projected outwardly in the diameter direction from the outer peripheral surface of the mounting portion 42. The angle of intersection between the pair of support plate portions 43, 43 is set at 120°. Therefore, the support plate portions 43, 43 of the support pieces 19b, 19b adjoining each other in the circumferential direction thereof are parallel to each other.

In the support plate portions 43, 43, there are formed circular holes 44, 44, respectively. In case where the support pieces 19b, 19b are held at their neutral states, the circular holes 44, 44 formed in the support plate portions 43, 43 of the support pieces 19b, 19b adjoining each other in the circumferential direction thereof are concentric with each other. And, pivot shafts 6, 6, which are disposed on the two end portions of each of first to third trunnions 7a, 7b, 7c, are supported in the circular holes 44, 44 by radial needle roller bearings 45, 45, respectively. The radial needle roller bearings 45, 45 respectively include outer races 46, 46, while the outer peripheral surfaces of the outer races 46, 46 are respectively formed as a spherically convex surface. The outer races 46, 46 are fitted into their respective circular holes 44, 44 in such a manner that they are prevented against rickety movements but can be swung and shifted.

Also, in the support plate portions 43, 43, there are formed screw holes 47, 47, respectively; and, studs 48, 48 are threadedly engaged into their associated screw holes 47, 47, while the leading end faces of these studs 48, 48 are contacted with the two end faces of the trunnions 7a, is 7b, 7c, respectively. The leading end faces of the studs 48, 48 are respectively formed as a spherically convex surface, whereby the trunnions 7a, 7b, 7c can be swung and shifted between the pair of studs 48, 48 which are disposed at mutually opposing positions. Also, lock nuts 49, 49 are threadedly engaged with the base end portions of the studs 48, 48 to thereby prevent the studs 48, 48 from being loosened unexpectedly. By the way, the studs 48, 48 are used to synchronize together the shifting movements of the three trunnions 7a, 7b, 7c, which are disposed in a single cavity, with respect to the circumferential direction of the input side and output side disks 2, 4 through the support pieces 19b, 19b. In case where the shifting movements of the three trunnions 7a, 7b, 7c can be synchronized together to a sufficient degree by an oil pressure actuator (which will be discussed later), the studs 48, 48 as well as lock nuts 49, 49 can be omitted.

The three trunnions 7a, 7b, 7c, as described above, are supported such that: they can be shifted to a slight degree with respect to the circumferential direction of the two disks 2, 4 due to the swinging movements of the support pieces 19b, 19b about their respective second pivot shafts 40, 40; and, they can be swung about their respective pivot shafts 6, 6 that are disposed on the two end portions of each of them. In order to execute a gear change operation, specifically, in order to shift the three trunnions 7a, 7b, 7c in the axial directions of the pivot shafts 6, 6 that are disposed on their respective two end portions, a toroidal-type continuously variable transmission according to the invention employs actuators which are structured as follows.

First, the first trunnion 7a, which is disposed in the central portion of the lower portion of the toroidal-type continuously variable transmission, can be driven or shifted by a pair of first oil pressure actuators 50a, 50b respectively disposed downwardly of the two end portions of the first trunnion 7a through link arms 51a, 51b, respectively. These oil pressure actuators 50a, 50b push out their respective rods 53 due to supply of pressure oil into their respective cylinders 52. However, in the present invention, as the a oil pressure actuators 50a, 50b, there are used oil pressure actuators of a single-acting type structured such that, even when the supply of pressure oil into the cylinders 52 is stopped, unless an external force is applied thereto, the rods 53 are prevented from being pulled back into the cylinders 52. The oil pressure actuators 50a, 50b are supported and fixed within the casing 5a in such a manner that they are concentric with each other and also that their respective rods 53 are pushed out in the mutually opposite directions due to the supply of the pressure oil, more specifically, their respective rods 53 are pushed out in the directions where they part away from the other oil pressure actuator 50a (or 50b).

Also, the middle portions of the link arms 51a, 51b are supported by their respective hollow tube-shaped third pivot shafts 54, 54 in such a manner that they can be swung and shifted. These third pivot shafts 54, 54 are respectively arranged in parallel to the second pivot shafts 40, 40, while the interior portions of the third pivot shafts 54, 54 respectively communicate with a discharge port formed in an oil supply pump (not shown). And, when the toroidal-type continuously variable transmission is in operation, lubricating oil (traction oil) is supplied into the third pivot shafts 54, 54. As described above, the middle portions of the link arms 51a, 51b are pivotally supported by the third pivot shafts 54, 54, respectively. Also, the one-side surfaces of the base end portions (in FIG. 1, the lower end portions) of the link arms 51a, 51b are respectively butted against the leading end faces of the rods 53 of the oil pressure actuators 50a or 50b; and, the one-side surfaces of the leading end portions (in FIG. 1, the upper end portions) of the link arms 51a, 51b are respectively engaged with the end portions of the pivot shafts 6, 6 disposed on the two end portions of the first trunnion 7a. By the way, the portions of the base end portions of the link arms 51a, 51b, which are to be butted against the leading end faces of the rods 53, are respectively formed as a partially-cylindrical-shaped convexly curved surface, so that the butting portions can be swung and shifted smoothly.

Figure 3:
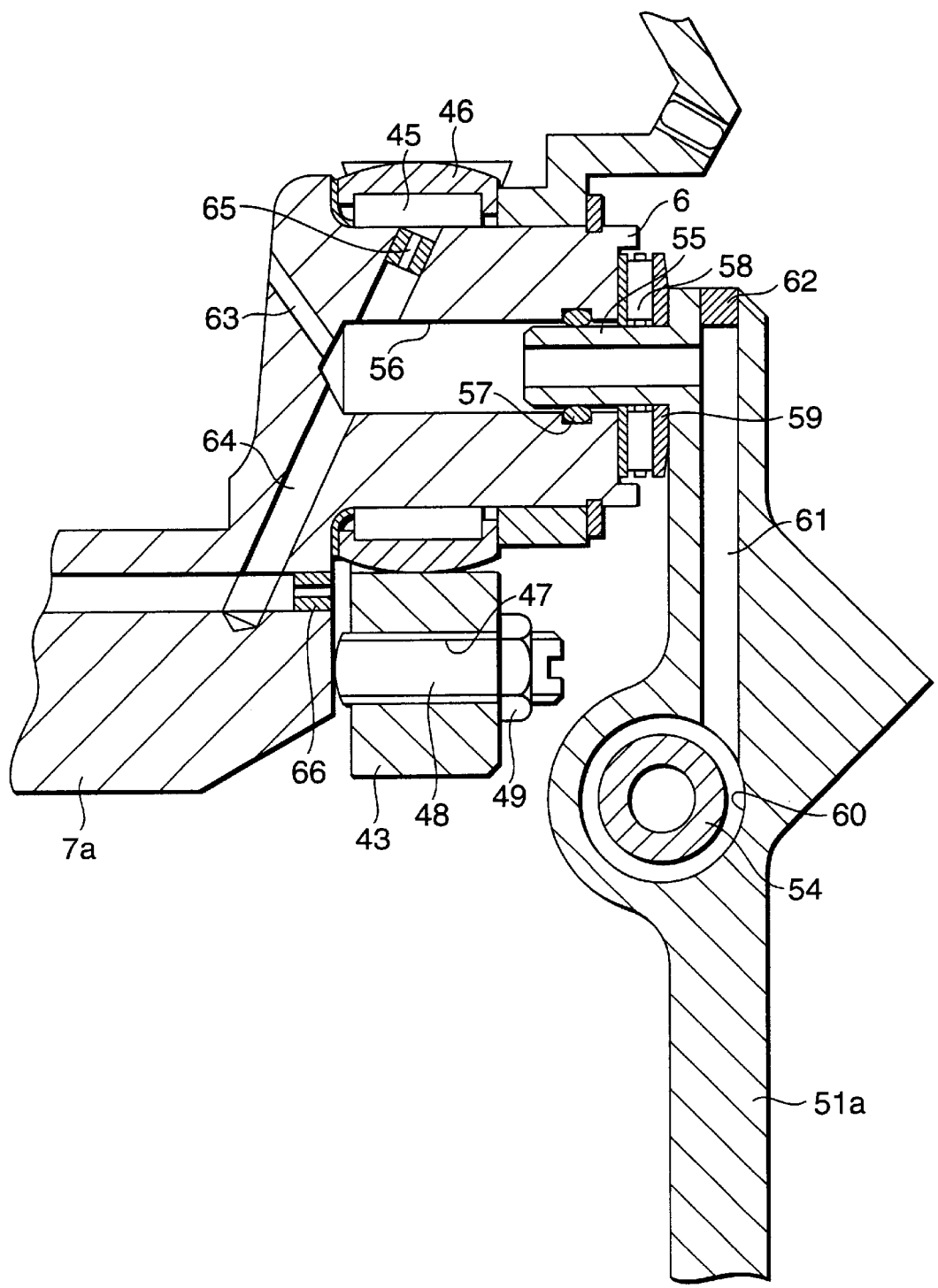
FIG. 3 is an enlarged view of the III portion shown in FIG. 1.

Also, in the illustrated embodiment, as shown in detail in FIG. 3, on the mutually opposing surfaces of the leading end portions of the respective link arms 51a, 51b, there are formed cylindrical-shaped projecting portions 55, respectively. On the other hand, in the central portions of the pivot shafts 6, 6 disposed on the two end portions of the first trunnion 7a, there are formed circular holes 56 each having an inside diameter larger than the outside diameter of the cylindrical-shaped projecting portions 55 in such a manner that the circular holes 56 are opened on the end faces of the pivot shafts 6, 6, respectively. And, the cylindrical-shaped projecting portions 55 of the link arms 51a, 51b are loosely inserted into the circular holes 56 of the pivot shafts 6, 6, respectively. In this state, the inner peripheral edges of O-rings 57 respectively secured to the inner peripheral surfaces of their associated circular holes 56 are elastically contacted with the whole outer peripheral surfaces of the middle portions of the cylindrical-shaped projecting portions 55, thereby keeping an oil tight condition between the inner peripheral surfaces of the circular holes 56 and the outer peripheral surfaces of the cylindrical-shaped projecting portions 55

Also, between the end faces of the pivot shafts 6, 6 and the leading end portion side surfaces of the link arms 51a, 51b, there are disposed thrust needle roller bearings 58. Of a pair of races forming the thrust needle roller bearing 58, one surface of the race 59 disposed on the link arms 51a, 51b side, that is, the surface of the race 59 to be contacted with the leading end portion side surfaces of the link arms 51a, 51b is formed as a spherically convex surface or a conically convex surface. Thanks to this structure, not only transmission of shifting movements is possible between the link arms 51a, 51b and the first trunnion 7a, but also the smooth swinging and shifting movements of the link arms 51a, 51b about their respective third pivot shafts 54, 54 and the smooth swinging and shifting movement of the first trunnion 7a about the pivot shafts 6, 6 are possible.

Also, the interior portions of the third pivot shafts 54, 54 and the interior portions of the cylindrical-shaped projecting portions 55 are in communication with each other through recessed grooves 60 respectively formed in the axial-direction middle portions of center holes formed in the link arms 51a, 51b and through communication oil holes 61 respectively formed in the interior portions of the front half sections (in FIGS. 1 and 3, the upper half sections) of the link arms 51a, 51b. By the way, the downstream end openings of the communication oil holes 61 are respectively closed by their associated plugs 62. Therefore, when lubricating oil is supplied from the oil supply pump (not shown) into the pivot shafts 54, 54, the whole quantity of the lubricating oil is fed into the circular holes 56 which are respectively formed in the central portions of the pivot shafts 6, 6. The lubricating oil, which is fed into the circular holes 56 in this manner, is used for lubrication of the rolling contact portions of the toroidal-type continuously variable transmission. That is, part of the lubricating oil is jetted out from nozzle holes 63, 63 respectively formed in the first trunnion 7a to lubricate the rolling contact portions between the inner surfaces 2a, 4a of the input side and output side disks 2, 4 and the peripheral surfaces 9a of the power rollers 9 supporting the first trunnion 7a.

Also, the remaining portion of the lubricating oil is fed into the respective rolling bearings and into the respective sliding contact portions through a lubricating oil flow passage 64 formed in the interior of the first trunnion 7a. Firstly, the remaining portion of the lubricating oil can be fed into radial needle roller bearings 45, 45, which respectively support the pivot shafts 6, 6, through their associated choke plugs 65. Also, the remaining portion of the lubricating oil can also be fed into the sliding contact portions between the leading end faces of the studs 48 and the first trunnion 7a as well through another choke plugs 66. Further, the remaining portion of the lubricating oil can also be fed into thrust needle roller bearings 15 and thrust ball bearings 14 which support the power rollers 9 with respect to the first trunnion 7a, as well as into radial needle roller bearings which are interposed between the displacement shafts 8 and the first trunnion 7a, power rollers 9.

Figure 4:
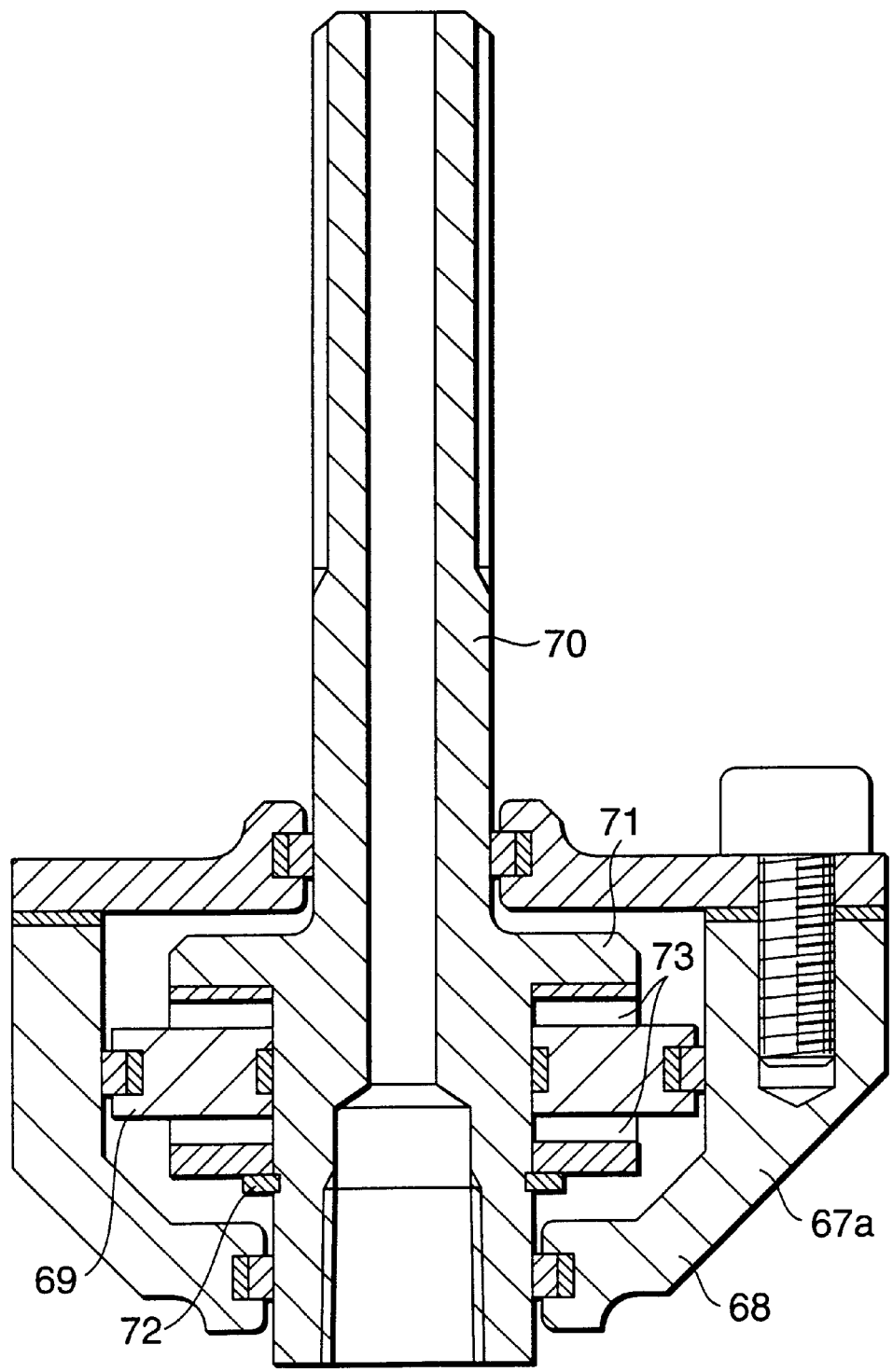
FIG. 4 is a section view of second and third oil pressure actuators of a double-acting type.
Figure 5:
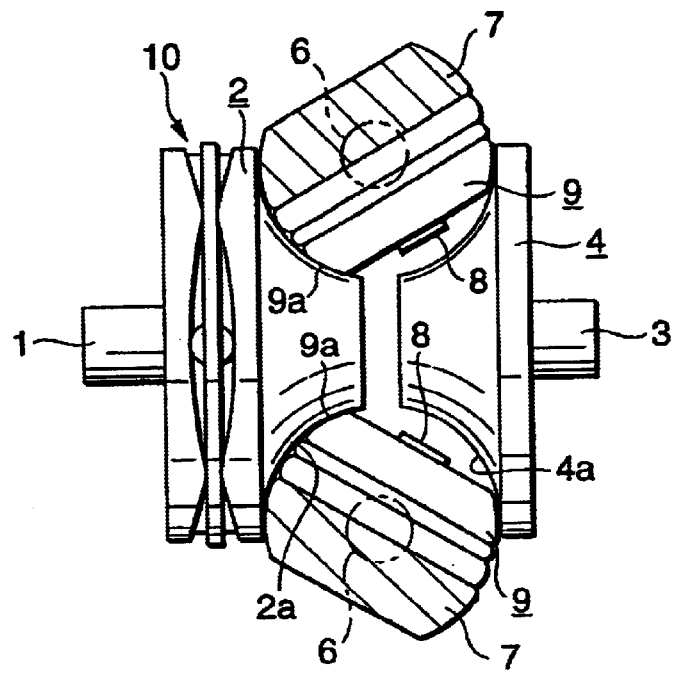
FIG. 5 is a side view of the basic structure of a conventional toroidal-type continuously variable transmission, showing its maximum deceleration state.
Figure 6:
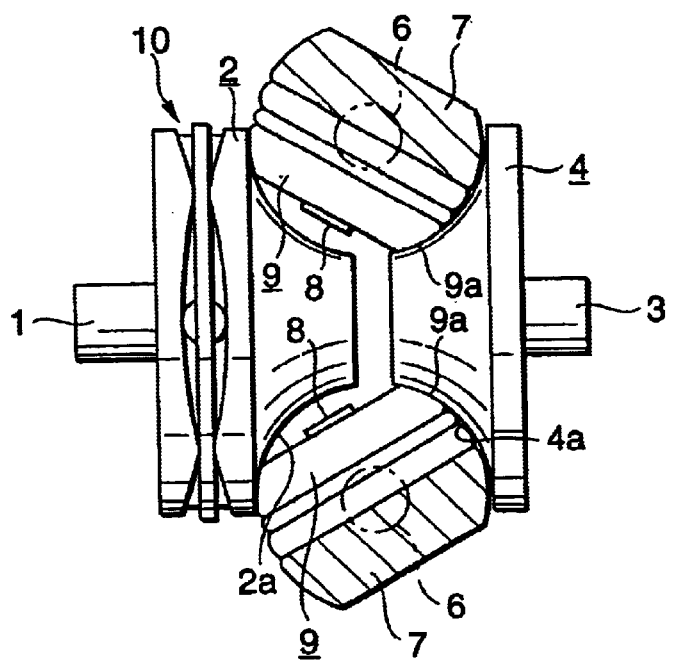
FIG. 6 is a side view of the basic structure of the conventional toroidal-type continuously variable transmission, showing its maximum acceleration state.
Figure 7:
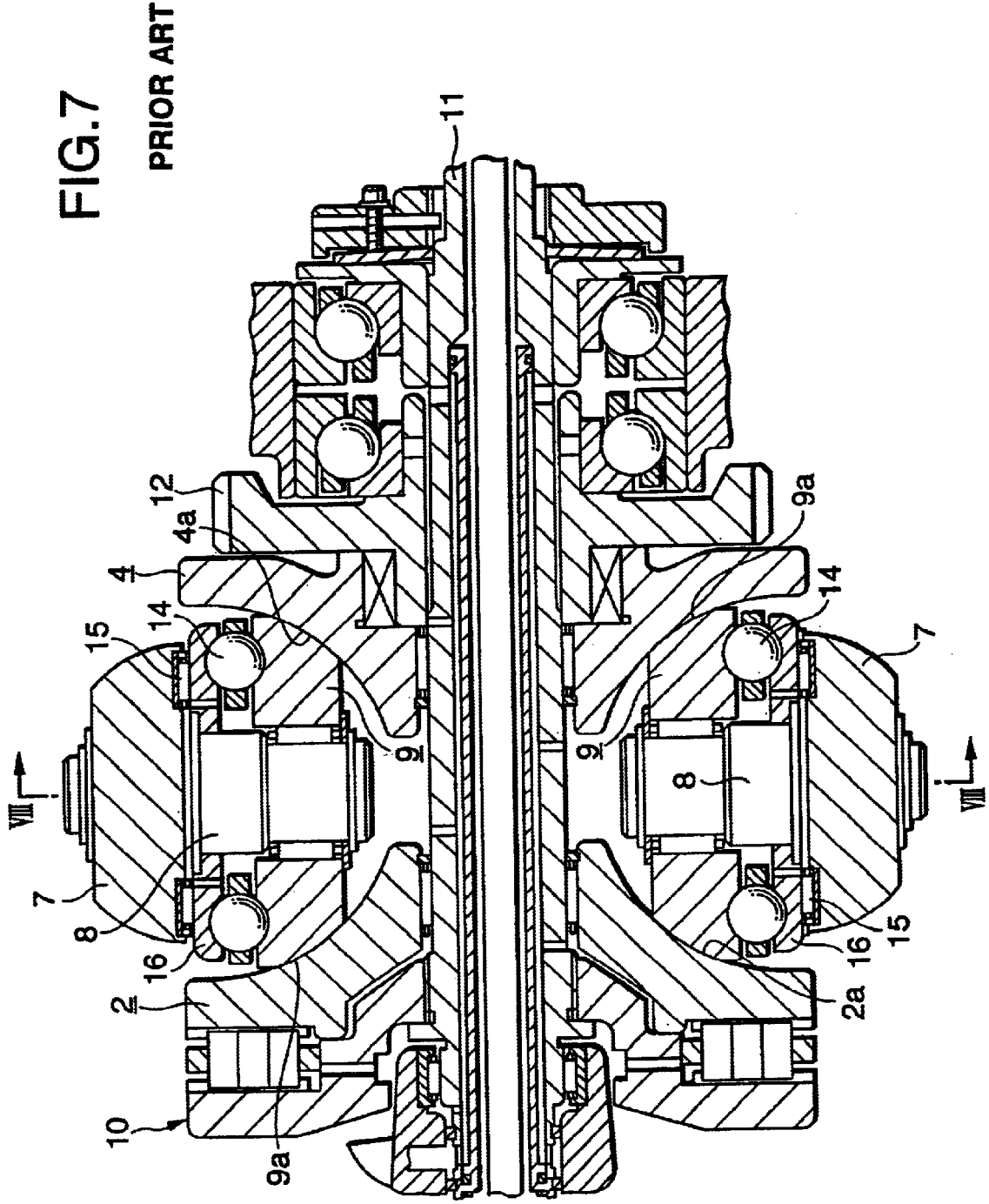
FIG. 7 is a section view of an example of a conventional specific structure.
Figure 8:
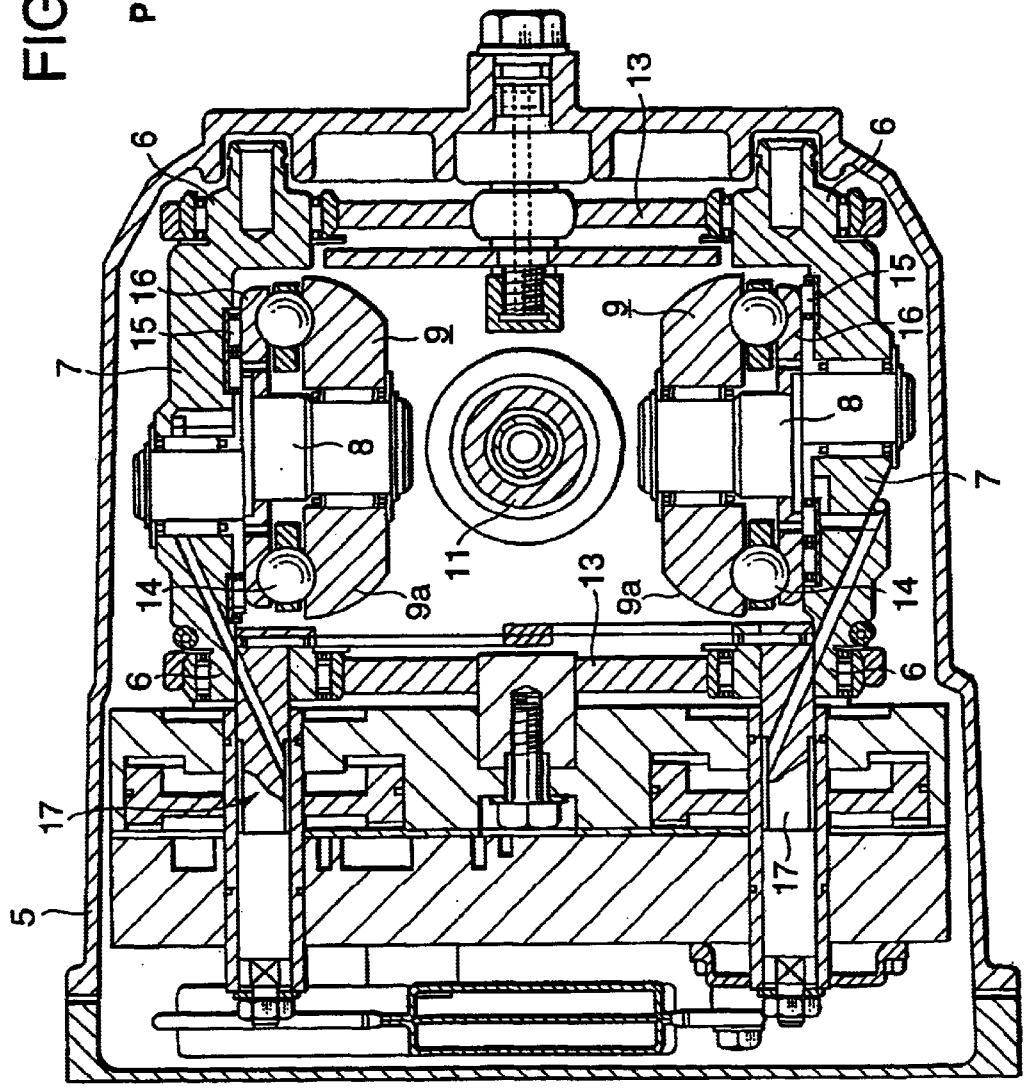
FIG. 8 is a section view, taken along the line VIII—VIII shown in FIG. 7.

On the other hand, in the case of the second and third trunnions 7b, 7c which are disposed in an inclined manner on the two sides of the upper portion of the toroidal-type continuously variable transmission, on the extensions of the pivot shafts 6, 6 of the trunnions 7b, 7c, there are disposed second and third oil pressure actuators 67a, 67b each of a double-acting type, the details of which are shown in FIG. 4, one actuator for each trunnion. And, by supplying pressure oil into the respective oil pressure actuators 67a, 67b and draining the pressure oil from them, the second and third trunnions 7b, 7c can be respectively shifted in the axial directions of the pivot shafts 6, 6 which are disposed on the two end portions of the respective trunnions 7b, 7c.

The oil pressure actuators 67a, 67b connect the base is end portion (in FIG. 4, the lower end portion) of a rod 70 to a piston 69 oil-tight fitted into a cylinder 68 in such a manner that the rod 70 can be freely rotated while it is prevented against its rickety motion in the axial direction thereof (in FIG. 4, in the vertical direction). In order to allow the rod 70 to rotate freely, in the illustrated embodiment, the piston 69 is held by and between a pair of thrust needle roller bearings 73, 73 in a sandwiched manner. By the way, since the two surfaces of the piston 69 serve as the raceways of the thrust needle roller bearings 73, 73, they are hardened as well as the surfaces thereof are finished as smooth surfaces. Also, in order to prevent the rod 70 against rickety motion in the axial direction thereof, in the illustrated embodiment, the piston 69 and the pair of thrust needle roller bearings 73, 73 are held by and between an outward-facing-flange-shaped collar portion 71 disposed in the middle portion of the rod 70 and a taper snap ring 72 secured to the near-base-end portion of the middle portion of the rod 70.

In the outer peripheral surface of the front half section (in FIG. 4, the upper half section) of the rod 70 forming the above-structured oil pressure actuators 67a, 67b, there is formed a male screw. The leading end portion of the rod 70 is threadedly engaged into a screw hole 74 formed in the central portion of a pivot shaft which is provided on and projected from one end face (in FIG. 1, the lower end face) of each of the trunnions 7b, 7c and is further fixed by a lock nut 75. In this state, the trunnions 7b, 7c can be shifted in the axial directions of the pivot shafts 6, 6, which are disposed on the two end portions of the respective trunnions 7b, 7c, by supplying the pressure oil into the oil pressure actuators 67a, 67b and draining the pressure oil therefrom.

By the way, in the illustrated embodiment, the rod 70 forming the above-structured oil pressure actuators 67a, 67b is formed so as to have a circular tube shape. And, to the connecting portion of the rod 70 which is formed in the base end portion (in FIGS. 1 and 4, the lower end portion) of the rod 70, there is connected the downstream end of a flexible oil supply hose (not shown), thereby being able to feed the lubricating oil into the rod 70 freely. And, the illustrated embodiment is structured such that the lubricating oil fed into the rod 70, similarly to the lubricating oil fed into the circular hole 56 of the first trunnion 7a, can be used to lubricate the respective members associated with the trunnions 7b, 7c.

Figure 9:
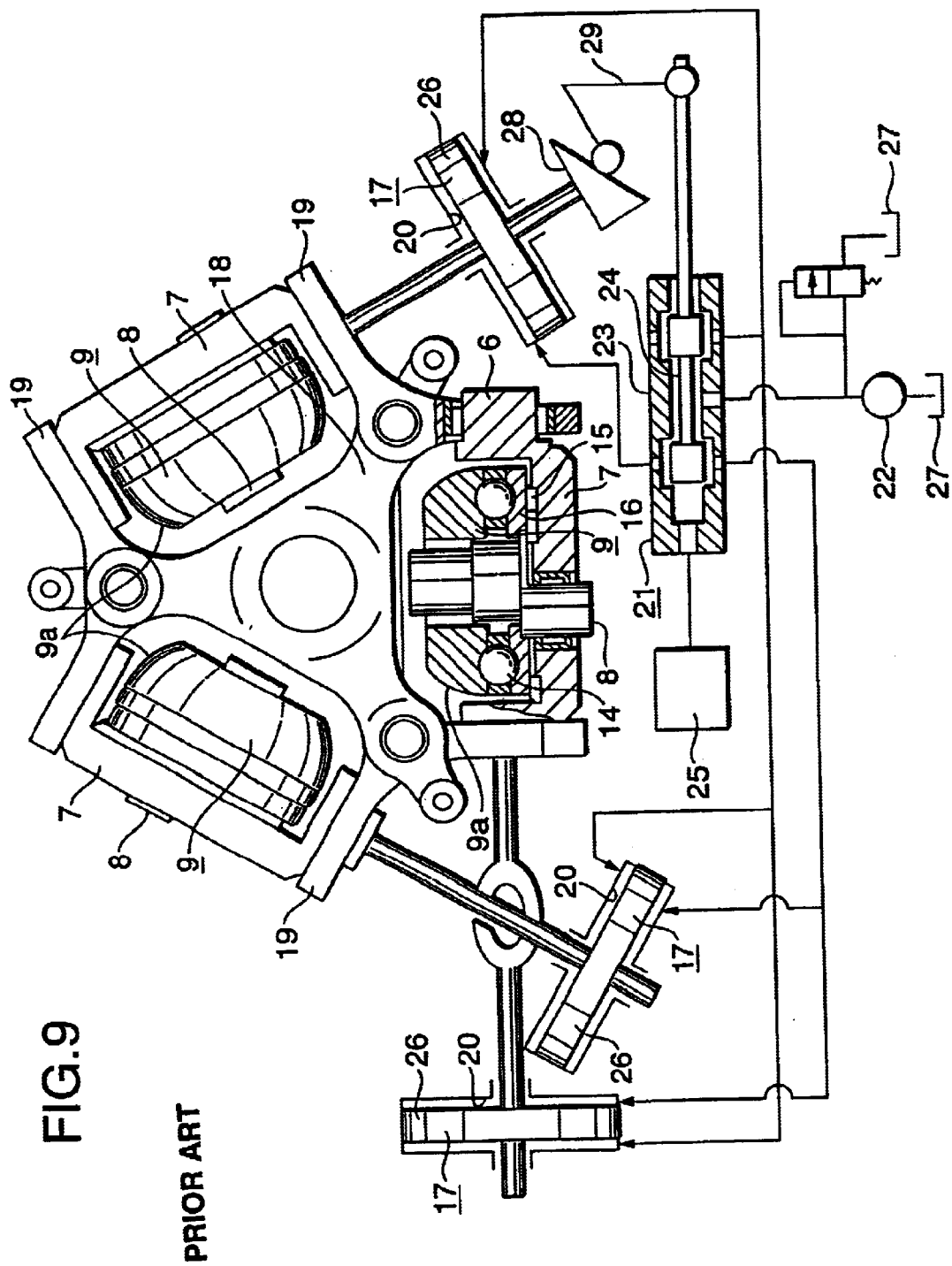
FIG. 9 is a partially cut-away front view of the main portions of an example of a conventional structure for increasing the power that can be transmitted.
Figure 10:
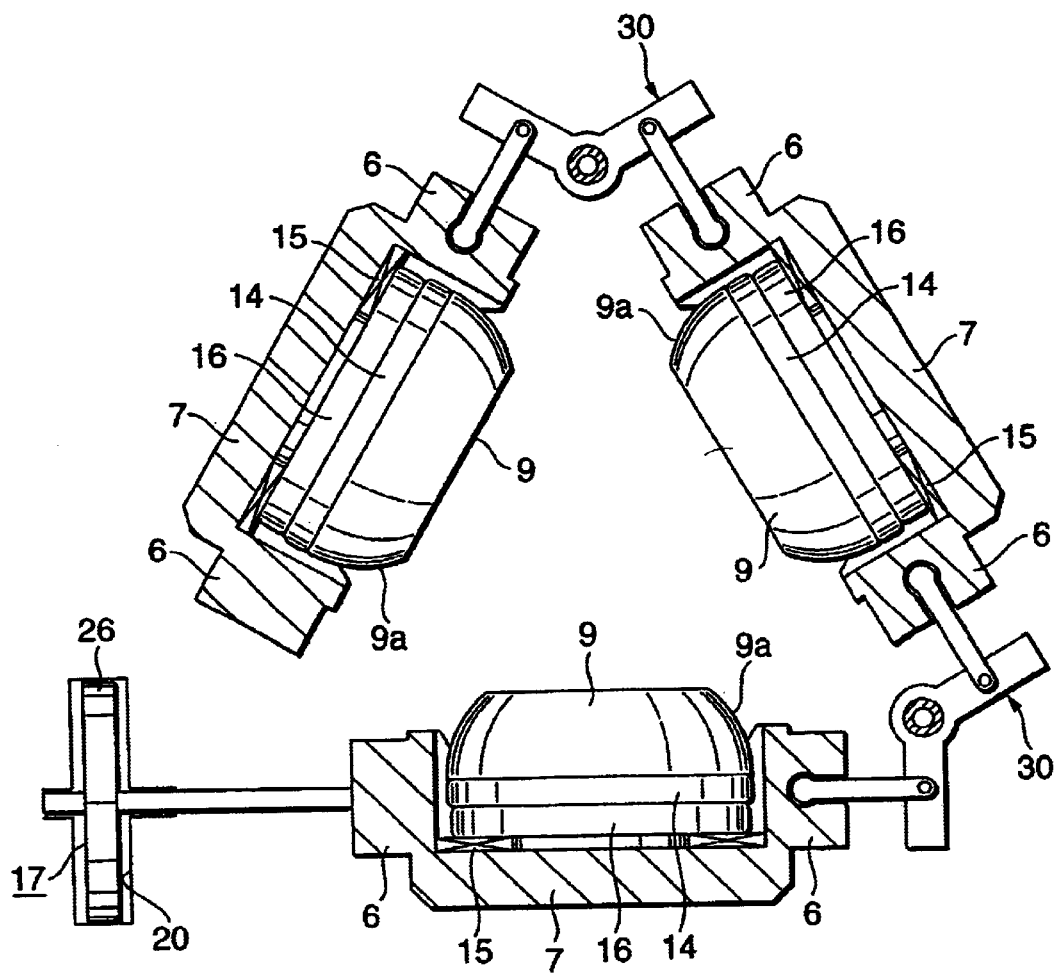
FIG. 10 is a section view of the main portions of a first example of a conventional structure capable of reducing the number of actuators as much as possible; and, FIG. 11 is a section view of the main portions of a second example of a conventional structure capable of reducing the number of actuators as much as possible.
Figure 11:
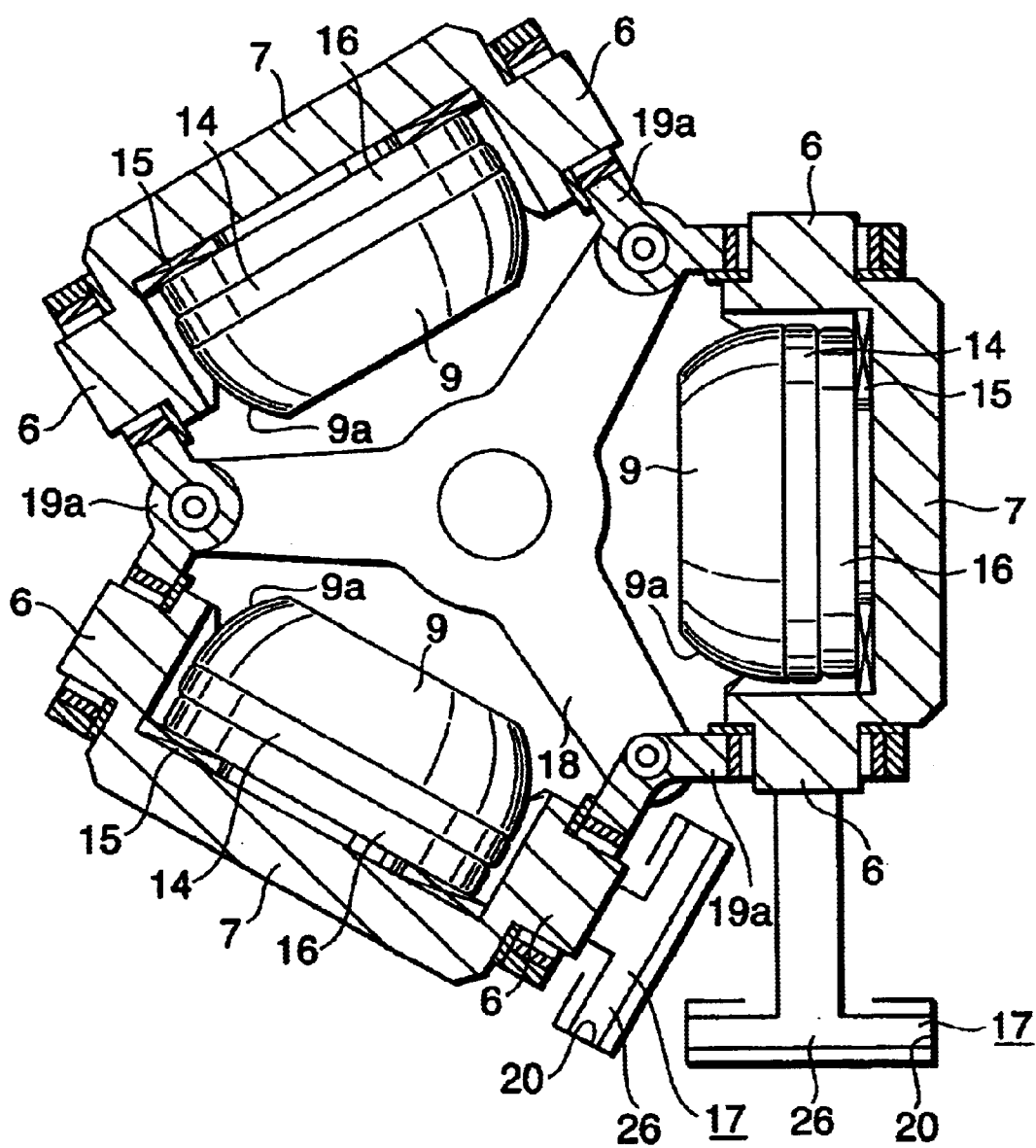

The above-mentioned supply and drain of the pressure oil with respect to the pair of first oil pressure actuators 50a, 50b each of a single acting type and the supply and drain of the pressure oil with respect to the second and third oil pressure actuators 67a, 67b each of a double acting type are executed in synchronization with each other using the single control valve 21 (see FIG. 9). And, the above three trunnions 7a, 7b, 7c are shifted by the same length in the same direction with respect to the rotation direction of the input side and output side disks 2, 4. The shifting movements of the trunnions 7a, 7b, 7c, as described above, can be synchronized with one another mechanically by the studs 48, 48. Also, since the trunnions 7a, 7b, 7c are driven by the first to third oil pressure actuators 50a, 50b, 67a, 67b which are respectively disposed on the trunnions 7a, 7b, 7c, when the forces for shifting the trunnions 7a, 7b, 7c are transmitted, their associated members are elastically deformed, thereby preventing the trunnions 7a, 7b, 7c from differing in the shift amount from one another. Therefore, the shift amounts of those trunnions 7a, 7b, 7c can be coincided with one another strictly.

Based on the above-described mutually synchronized shifting movements, the trunnions 7a, 7b, 7c are respectively swung about their associated pivot shafts 6, 6 which are disposed on the two end portions thereof. That is, based on the shifting movements of the trunnions 7a, 7b, 7c, as described above, there are changed the directions of the forces applied in the tangential direction to the rolling contact portions between the peripheral surfaces 9a, 9a of the power rollers 9, 9 and the inner surfaces 2a, 4a of the input side and output side disks 2, 4. And, due to such changes of the force directions, the trunnions 7a, 7b, 7c are swung and shifted about their respective pivot shafts 6, 6 disposed on the two end portions thereof. The shifts of the trunnions 7a, 7b, 7c, which are carried out in this manner, are taken out by the precess cam 28 fixed to the periphery of the near-base-end portion of the middle portion of the rod 70 connected to any one 7c (that is, trunnion disposed on the upper left side in FIG. 1) of the trunnions. And, the shift of the precess cam 28 is transmitted through the link 29 to the spool 24 of the control valve 21 (FIG. 9), thereby controlling the opening and closing operation of the control valve 21. Such control is similar to the conventional structure previously shown in FIG. 9.

As can be seen clearly when FIG. 1 showing the structure according to the invention is compared with FIG. 9 showing the conventional structure from the same direction as FIG. 1, a toroidal-type continuously variable transmission according to the invention which is structured and operates in the above-mentioned manner can be reduced in size as a whole. That is, it is possible to reduce the projecting amounts of the first to third oil pressure actuators 50a, 50b, 67a, 67b for shifting the trunnions 7a, 7b, 7c from the outer peripheral edges of the input side and output side disks 2, 4 in the diameter direction thereof. In other words, the oil pressure actuators 50a, 50b, 67a, 67b can be arranged with enhanced efficiency, thereby being able to reduce the outside dimensions of the casing 5a for storing the present toroidal-type continuously variable transmission. The reduced size and weight of the toroidal-type continuously variable transmission makes it possible to enhance the freedom of design of a vehicle into which the present toroidal-type continuously variable transmission is incorporated.

Since a toroidal-type continuously variable transmission according to the invention is structured and operates in the above-described manner, according to the invention, there can be provided a toroidal-type continuously variable transmission which is capable of transmitting large power, is compact and can be assembled in a limited installation space. This can facilitate the design of an automatic transmission which incorporates therein the present toroidal-type continuously variable transmission as well as can secure a stable gear change operation.

While only certain embodiment of the invention has been specifically described herein, it will apparent that numerous modifications may be made thereto without departing from the spirit and scope of the invention.

What is claimed is:

1. A toroidal continuously variable transmission, comprising:
    a casing;
    an input shaft rotatably supported within said casing;
    an input side disk supported on the periphery of said input shaft in such a manner as to be rotatable together with said input shaft;
    an output side disk disposed so as to be concentric with said input side disk and to be relatively rotatable with respect to said input side disk;
    trunnions interposed between said input side and output side disks in such a manner as to be respectively swung about pivot shafts disposed at twisted positions with respect to center axes of said two disks, said trunnions including three first, second and third trunnions for each pair of input side and output side disks;
    displacement shafts provided on said respective trunnions so as to project from the inner surfaces of said trunnions, said one displacement shaft being provided for each trunnion;
    power rollers rotatably supported on said respective displacement shafts and interposed between said input side and output side disks, said one power roller being provided for each trunnion; and,
    actuators for shifting said respective trunnions in the axial direction of said pivot shafts disposed on the two end portions of said trunnions,
    wherein said actuators are composed of a pair of first single-acting oil pressure actuators for shifting said first trunnion in the mutually opposite directions through link arms, and second and third double-acting oil pressure actuators respectively disposed on said second and third trunnions.

2. A toroidal continuously variable transmission as set forth in claim 1, wherein supply and drain of pressure oil to and from said first to third oil pressure actuators are carried out in synchronization with one another using a single control valve.

3. A toroidal continuously variable transmission as set forth in claim 1, wherein said first oil pressure actuator comprises a rod butting against one side surface of a base end portion of said link arm at a leading end face of said rod, and
    wherein a portion of said base end portion of said link arm, which is to be butted against said leading end face of said rod, is formed as a partially cylindrical-shaped convexly curved surface.

4. A toroidal continuously variable transmission as set forth in claim 1, wherein one-side surfaces of leading end portions of said link arms are respectively engaged with end portions of said pivot shafts respectively disposed on two end portions of said first trunnions,
    wherein thrust needle roller bearings are respectively interposed between said one-side surfaces of the leading end portions of said link arms and said end portions of said pivot shafts, and
    further wherein each of said thrust needle roller bearings includes a pair of races, one of said races, which is disposed on the link arm side, has a surface to be contacted with a leading end portion side surface of said link arm, and said surface of said one of races is formed as a spherically convex surface or as a conically convex surface.

5. A toroidal continuously variable transmission as set forth in claim 1, wherein one-side surfaces of leading end portions of said link arms are respectively engaged with end portions of said pivot shafts respectively disposed on two end portions of said first trunnions, and
    wherein said leading end portion of said link arm has a cylindrically projecting portion being loosely inserted into a circular hole formed in a central portion of said pivot shaft.

* * * * *